(12) United States Patent
Yoder

(10) Patent No.: US 6,224,716 B1
(45) Date of Patent: May 1, 2001

(54) APPARATUS FOR DEHYDRATING OIL

(75) Inventor: Perry D. Yoder, Lake Charles, LA (US)

(73) Assignee: Oilquip, Inc., Lake Charles, LA (US)

( * ) Notice: Subject to any disclaimer, the term of this patent is extended or adjusted under 35 U.S.C. 154(b) by 0 days.

(21) Appl. No.: 09/044,207

(22) Filed: Mar. 18, 1998

(51) Int. Cl.$^7$ .............................. B01D 3/06; B01D 3/10; B01D 3/42

(52) U.S. Cl. ........................... 202/160; 159/44; 159/901; 159/DIG. 16; 159/DIG. 40; 159/2.1; 196/127; 196/132; 196/141; 196/114; 202/205; 202/206; 202/264

(58) Field of Search ........................... 159/901, DIG. 16, 159/44, DIG. 40, 16.1, 2.1; 202/205, 160, 206, 202, 264; 203/20, 1–3, DIG. 18, 14, 49, 93–94, 98, 91, 160, 888; 196/132, 141, 114, 127; 210/180, 774

(56) References Cited

U.S. PATENT DOCUMENTS

| | | | |
|---|---|---|---|
| 2,937,977 | 5/1960 | Topol | 196/46.1 |
| 3,249,438 | 5/1966 | Tolpol | 196/46.1 |
| 3,448,038 | 6/1969 | Pall et al. | 208/187 |
| 3,675,395 | * 7/1972 | Baranowski | 96/159 |
| 3,998,738 | 12/1976 | Kusay | 210/180 |
| 4,534,312 | * 8/1985 | Shinga et al. | 165/104.26 |
| 4,589,955 | * 5/1986 | Nukala et al. | 196/114 |
| 4,717,468 | * 1/1988 | Funk | 208/356 |
| 4,784,751 | 11/1988 | McGehee | 208/181 |
| 4,830,745 | 5/1989 | van der Meulen | 210/168 |
| 5,096,598 | 3/1992 | Pecen et al. | 210/741 |
| 5,135,616 | * 8/1992 | Nicholson et al. | 196/46 |
| 5,423,979 | * 6/1995 | Allan | 210/168 |
| 5,628,901 | 5/1997 | Lawrence et al. | 210/251 |
| 5,770,019 | * 6/1998 | Kurematsu et al. | 202/160 |
| 5,814,207 | * 9/1998 | Kenton | 208/184 |
| 5,820,748 | * 10/1998 | Shadikhan | 202/205 |
| 5,904,836 | * 5/1999 | Lee et al. | 196/46 |

OTHER PUBLICATIONS

Article from Pall Industrial Hydraulics Corp., Pall HSP Portable Oil Purifier, pp. 1–4, Apr. 1986.
Article from Pall Industrial Hydraulics Corp., "Pall HFP Oil Purifier", pp. 1–4, Jul. 1986.
Article from Pall Industrial Hydraulics Corp., "Extending Hydraulic Fluid Life by Water and Silt Removal", pp. 1–9, 1978.

(List continued on next page.)

Primary Examiner—Virginia Manoharan
(74) Attorney, Agent, or Firm—Fletcher, Yoder & Van Someren

(57) ABSTRACT

A system for dehydrating lubricating and hydraulic fluids includes a heating circuit and circuitry for creating a vacuum. The heating circuitry introduces a stream of heated fluid into a vacuum chamber in which a partial vacuum is drawn by the vacuum circuit. Aqueous components of the fluid stream are flashed in the vacuum chamber by virtue of the elevated temperature and reduced pressure. Dehydrated fluid is then collected and evacuated from the vacuum chamber. Vapor from the vacuum chamber, including the aqueous components of the fluid stream are collected, condensed and separately evacuated. The heating circuit limits surface temperature of a heating element in a closed-loop manner to avoid degradation of the fluid. The fluid stream is introduced into the vacuum chamber or is recirculated through the heating circuit to maintain a desired level of fluid temperature in a closed-loop manner. The system includes circuits for evacuating dehydrated fluid in a closed-loop manner and for automatically discharging condensate. The technique avoids undesirable foaming of dehydrated fluid within the vacuum chamber. A vacuum pulsing circuit is provided for periodically pulsing vacuum pressure within the vacuum chamber to aid in flashing aqueous components from the heated fluid stream.

31 Claims, 6 Drawing Sheets

OTHER PUBLICATIONS

Article from Pall Industrial Hydraulics Corp., "The Pall Oil Purification System Guide", pp. 1–8, Oct. 1977.

Article from Pall Industrial Hydraulics Corp., "The Pall Oil Purification System Guide", pp. 1–8, date unknown.

Article from Aquanetics, Inc., "3 R's of Lubricating and Hydraulic Oils", pages and date unknown.

Article from Aquanetics, Inc., "Aquanetics Portable Handtruck Model Phors 40A", pages and date unknown.

Catalog from The Hillard Corp., HILCO Filters & Processing Systems For Oils or Similar Liquids, pp. 1–19, Feb. 1979.

Catalog from Gulfgate Engineering, Inc., "Lo–Vac Oil Conditioner", pages and date unknown.

Catalog entitled, Fil–Thermo Vac, pp. 1–18, 11 date and author unknown.

Catalog from Gulfgate Engineering, Inc., "Lo–Vac 360–CX–16", pages and date unknown.

Catalog from Gulfgate Engineering, Inc., "Vacuum Oil Purifiers, Model G 865", pages and date unknown.

Catalog from Design News, "Oil Reclaimer Mounts on Reservoir", pp. 122–123, Mar. 4, 1985.

Catalog from Aquanetics, Inc., Engineers's Digest, "Recycling Industrial Oil—advanced Reclaimation Process Helpd Plants Slash Oil Bills, Improve Efficiency", pages and date unknown.

Article from Plant Engineering, Wringing Out Moisture From Hydraulic Oil, pp. 62–65, Jul. 25, 1985.

Oil Purfication Methods, author unknown, pp. 1–7, misc. pages, date unknown.

* cited by examiner

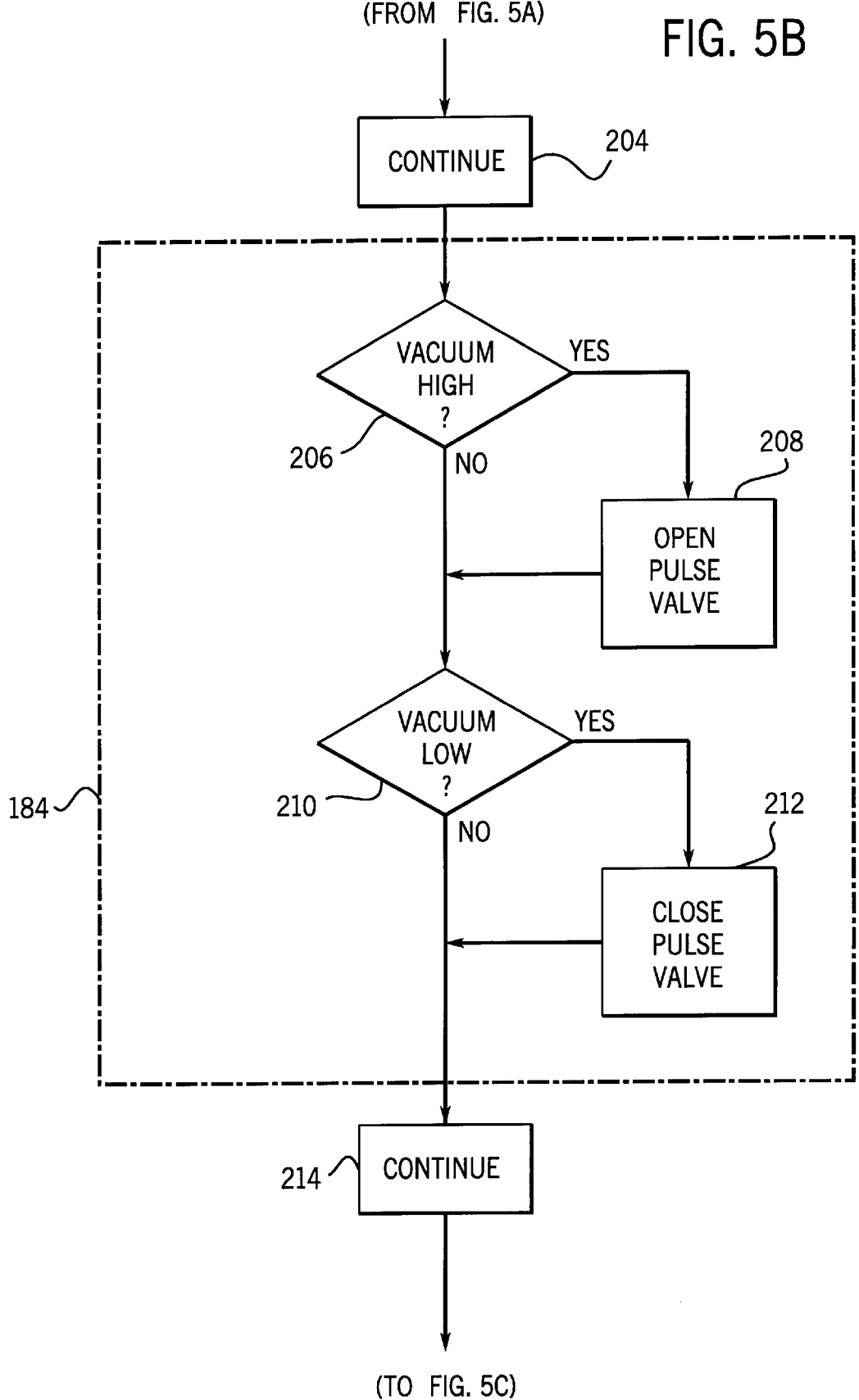

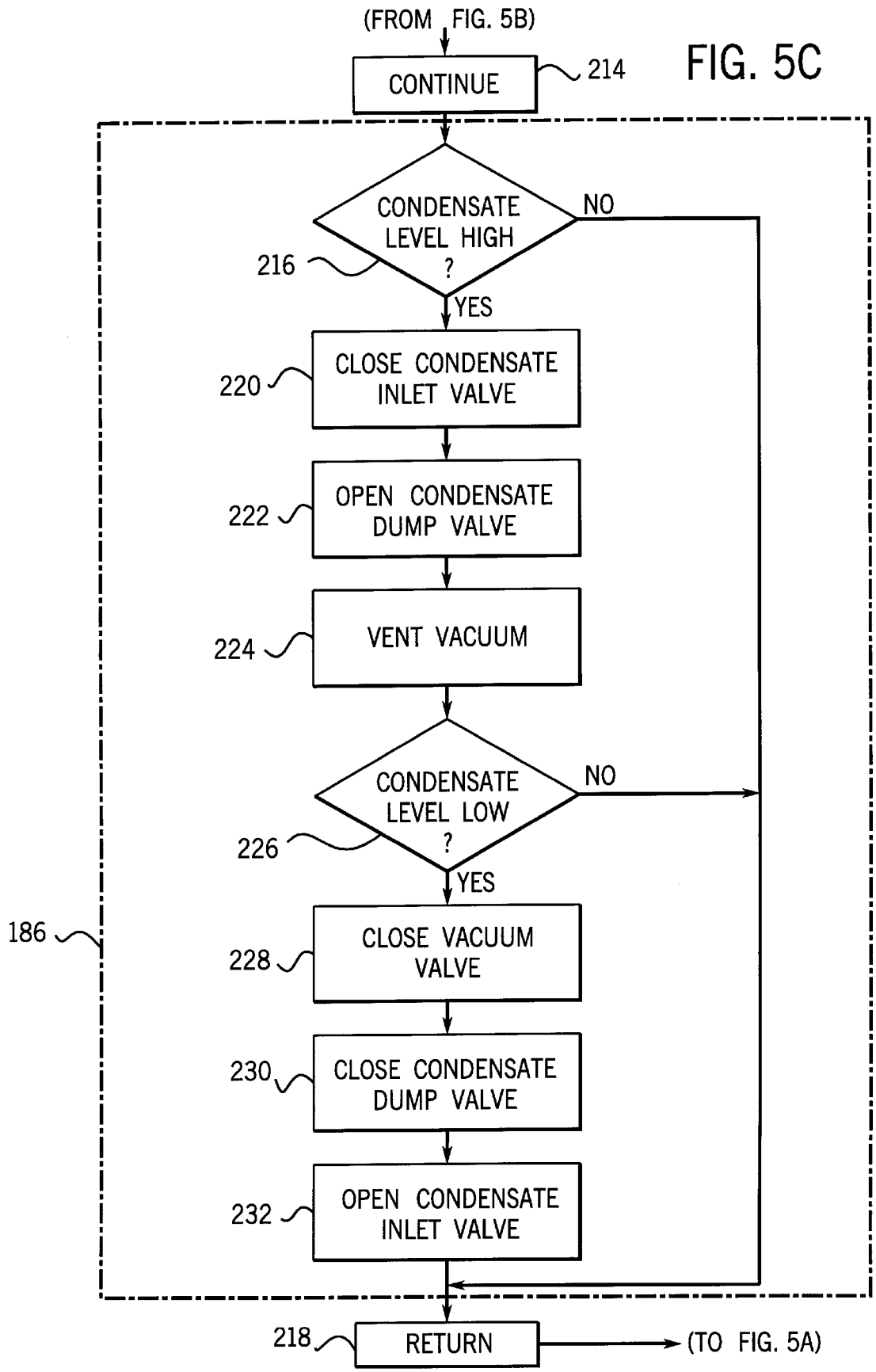

APPARATUS FOR DEHYDRATING OIL

BACKGROUND OF THE INVENTION

1. Field of the Invention

The present invention relates generally to an apparatus for removing water and gas from oil-based lubricants and the like. More particularly, the invention relates to an improved system for removing entrained, dissolved or emulsified water and other impurities from hydraulic and lubricating oils by means of a circulating system including a heating and vacuum flow loop.

2. Description of the Related Art

A wide variety of industrial, mobile, mining and other applications exist for machine systems wherein a petroleum or synthetic oil is employed as a lubricating or power transmission medium. For example, mechanical power transmission equipment typically includes bearings, gear boxes, chain drives, and the like which require ongoing lubrication. In a typical bearing application, a lubricant, such as petroleum-based lubricating oil is circulated through a bearing housing to flush and lubricate an antifriction bearing. In other applications a lubricant bath is provided, such as for large gear reducers, and lubricant may be circulated from the bath to be cooled and cleaned on an ongoing basis.

Other applications include industrial and mobile oil-based hydraulic systems wherein a natural or synthetic oil is employed both for lubricating purposes and to transmit power. Such systems generally include a positive displacement pump coupled to pressure conduits and valving for transmitting pressurized oil to actuators, such as hydraulic motors and cylinders. Such systems also typically include an oil reservoir having a capacity sufficient to supply anticipated volumetric needs of the system components, as well as to provide sufficient cooling and settling of oil circulated through the components. Additional filtering devices are often included, such as suction strainers upstream of pumps, and high and low pressure filters at appropriate locations in the system to remove dirt, debris and other contaminants.

Due to the lubricating function of the oils employed in applications of the types described above, it is generally important to maintain a relatively low level of solid, aqueous and gaseous contaminants. Such contaminants typically enter systems through seals, such as shaft seals on rotating shafts or linearly extending and retracting cylinder shafts, as well as by the normal internal wear of system components. Certain contaminants, such as water, may enter the oil by condensation, such as along internal walls or baffles of the system reservoir. If left within the system, such contaminants may significantly reduce the usable life of system components, causing accelerated wear of both soft and hard seals, as well as to metal parts. In addition, entrained water and gasses may lead to microscopic level cavitation and subsequent implosion, pitting or otherwise degrading system components. Finally, water and other corrosive materials can often lead to superficial oxidation of metallic parts which further degrades the systems.

Various techniques have been devised and are presently employed for removing contaminants from oil-based lubricant and hydraulic systems. For solid contaminants, conventional filtration is often an effective removal device. Aqueous and gaseous contaminants are, however, often difficult to remove via conventional filtering systems. While filter elements have been devised for capturing and storing water, such elements tend to add significantly to the cost of the systems over time, and may require frequent replacement of filter elements, particularly where water is entrained into or condensed into the system in relatively high volumes.

A different approach to the removal of water and gaseous contaminants from oils is based upon evaporating or flashing such contaminants from the oil by means of heating and circulation of the contaminated oil through a vacuum chamber. A system generally of this type is described in U.S. Pat. No. 2,937,977 issued to Topol on May 24, 1960. As described in that reference, such systems often include an electric heating element over which contaminated oil is circulated to raise the temperature of the oil and any entrained contaminants. The oil is then circulated into a vacuum vessel where emulsified or entrained water is vaporized by a combination of the elevated temperature and the reduced pressure. The dehydrated oil may then be collected and recirculated to the application, while removed water is condensed, collected and disposed of separately.

While dehydrating systems of the type described above represented significant advancements in the treatment of contaminated oils and lubricants, they are not without drawbacks. For example, in conventional systems contaminated oil directly contacts the heating element as it circulates through the system heating unit. Because the systems are designed to raise the temperature of the contaminated fluid to a point required to flash entrained and emulsified contaminants, the heating elements are typically energized and de-energized based upon temperature of the stream of contaminated fluid flowing out of the heating unit. As a result, the heating element is often fully energized to rapidly heat the contaminated fluid, resulting in heating element skin temperatures sufficiently elevated to cause significant degradation of the oil. Moreover, because the incoming flow of contaminated fluid is typically at a substantially lower temperature than the desired temperature for flashing contaminants, the thermal energy required to be input by the heating element is quite significant, exacerbating the difficulties related to elevated skin temperatures of the heating element.

To achieve the required fluid temperature with a heating element of limited thermal capacity, certain prior art systems recirculate the entire flow of contaminated fluid through the entire system until the desired temperature is obtained. Once the desired temperature is reached, valving is shifted to direct flow to the vacuum vessel. The incoming flow of contaminated fluid is then regulated to provide the residence time necessary for sufficient heating. However, such systems are generally relatively inefficient and require operator intervention during startup and transient periods. Moreover, such systems do not effectively avoid the problem of elevated heating element skin temperatures and their effect on the lubricating fluids.

In addition to the drawbacks mentioned above, heretofore known vacuum dehydrating systems often suffer from deficiencies in the structure and operation of their vacuum and fluid evacuation sections. For example, prior art systems of the type described above typically employ an evacuation pump for drawing dehydrated oil from the vacuum vessel. The evacuation pump draws fluid collecting in the bottom of the vessel to circulate the fluids back to the application or reservoir. However, because the evacuation pump draws fluid already subject to a local pressure lower than atmospheric pressure, a certain volume of fluid is generally allowed to collect in the vacuum vessel to provide a reserve of fluid for the evacuation pump. It has been found that larger volumes of collected fluid in the vacuum vessels leads to undesirable foaming of the collected fluid.

In one proposed solution to the problem of dehydrated oil foaming in such systems, a well or sump is provided at the base of the vacuum vessel. The sump is intended to permit the accumulation of a limited amount of decontaminated fluid in the vacuum vessel to maintain the desired feed flow for the evacuation pump and to limit foaming. A system generally of this type is described in U.S. Pat. No. 3,249,438 issued to Topol on May 3, 1966. However, it has been found that such structures are generally insufficient to avoid the collection of significant volumes of fluid in the vacuum vessel, and thus reduce foaming, while adequately supplying the evacuation pump.

A further drawback in heretofore known vacuum dehydration systems resides in the structure and operation of the vacuum section of the systems. In particular, systems of the type described above typically include a vacuum pump which is operated in an open loop manner to draw the highest possible vacuum in the vacuum vessel. Coalescing filters or other devices may be employed in the vacuum vessel to increase the surface area of the fluid, or otherwise to bring emulsified or entrained water to a surface level to facilitate its evaporation. Such devices may also include various mechanical structures for increasing the overall surface area of the fluid stream as it passes through the vacuum vessel. However, other than the flow of fluid through the vacuum vessel, such systems do not provide for circulation or flow of gasses within the vacuum vessel. Similarly, once the desired maximum vacuum pressure is attained, such systems do not vary the vacuum to obtain optimization of evaporation or flash rates.

There is a need, therefore, for an improved system for removing contaminants, particularly entrained and emulsified water, from lubricating and hydraulic fluids. There is currently a particular need for systems of this type which can be implemented on an as needed basis on existing equipment, or which can be made resident with machinery to remove aqueous and gaseous contaminants on a regular basis in cooperation with other filtration systems for the removal of solid phase contaminants.

SUMMARY OF THE INVENTION

The invention provides an innovative technique for dehydrating lubricating and hydraulic fluids designed to respond to these needs. The system provides for heating and drawing a vacuum on contaminated fluids as they flow in a continuous process stream through the system components. The technique permits the process stream to be heated to the desired temperature for introduction into a vacuum vessel, while limiting skin temperatures to levels which do not result in degradation of the lubricant or oil. Control of fluid recirculated through a heater unit provides for a steady stream of heated, contaminated fluid into the vacuum vessel while reducing the need for operator intervention in adjusting the system during startup and transient periods. The system also offers control of the level of dehydrated fluid in the vacuum vessel in a manner which reduces or avoids unwanted foaming, while providing adequate supply to a vessel evacuation pump. Flow of gasses within the vacuum vessel may be pulsed or regulated so as to enhance evaporation of aqueous contaminants within the vessel. The system may be scaled up or scaled down in various manners depending upon the needs of particular applications. Moreover, system may be adapted for periodic treatment of fluids on existing equipment, or may structured to remain resident with process equipment in machine systems.

Thus, in accordance with one aspect of the invention, a system is provided for removing aqueous components from a fluid. The system includes a pumping unit, a heating circuit, a vacuum circuit, and a control circuit. The pumping unit is configured to pump a stream of fluid from which aqueous components are to be removed. The heating circuit is coupled to the pumping unit for heating the fluid stream. The heating circuit includes a heating element, and a sensor for detecting temperature of a surface of the heating element and for generating a surface temperature signal representative thereof. The vacuum circuit is coupled to the heating circuit and subjects the heated fluid stream to a pressure lower than atmospheric pressure to remove aqueous components from the fluid stream. The control circuit is coupled to the heating circuit and is configured to limit energy input to the heating element to thereby limit the temperature of the heating element surface based upon the surface temperature signal.

In accordance with another aspect of the invention, a system for removing aqueous components from a fluid includes a pumping unit, a heating circuit, a vacuum circuit and a recirculation circuit. The pumping unit pumps a stream of fluid from which aqueous components are to be removed, while the heating circuit heats the fluid stream. The vacuum circuit is positioned downstream of the heating circuit for subjecting heated fluid to a pressure lower than atmospheric pressure to remove aqueous components therefrom. The recirculation circuit is coupled to the heating circuit, and includes a fluid temperature sensor and a recirculation loop. The recirculation loop directs a first portion of the fluid stream through the heating circuit based the fluid temperature and directs a second portion of the fluid stream through the vacuum circuit. The recirculation circuit may be used in conjunction with a surface temperature limiting circuit to provide a desired level of heating of the fluid stream, while avoiding heating element surface temperatures which could lead to degradation of the fluid.

In accordance with a further aspect of the invention, a system for removing aqueous components from a fluid includes the pumping unit, a heating circuit, a vacuum circuit and an evacuation circuit. The pumping unit provides a stream of fluid from which aqueous components are to be removed, while the heating circuit heats the fluid stream. The vacuum circuit, downstream of the heating circuit, subjects the heated fluid to a lower than atmospheric pressure to remove aqueous components therefrom. The vacuum circuit includes a vacuum chamber and means for drawing a vacuum within the vacuum chamber. The evacuation circuit evacuates dehydrated fluid from the vacuum chamber based upon a level of dehydrated fluid within the vacuum chamber. In a particularly, preferred configuration, the evacuation circuit includes a level sensor and an evacuation pump which draws dehydrated fluid from the vacuum chamber based upon a level signal developed by the level sensor.

In accordance with still another aspect of the invention, a system for removing aqueous components from a fluid includes the pumping unit, a heating circuit, a vacuum circuit, an evacuation circuit and means from cyclically varying vacuum pressure. The pumping unit and heating circuit provide a stream of heated fluid from which aqueous components are to be removed. The vacuum circuit subjects the heated fluid to a partial vacuum to remove aqueous components therefrom. The evacuation circuit evacuates dehydrated fluid from a vacuum chamber included in the vacuum circuit. The means for cyclically varying vacuum pressure causes variations in the level of vacuum drawn within the vacuum chamber. In a particularly preferred arrangement, the means includes a pressure sensor for detecting pressure within the vacuum chamber, and a valve configured to allow flow of atmospheric pressure within the vacuum chamber based upon the pressure within the chamber.

In accordance with yet another aspect of the invention, a system for removing aqueous components from a fluid includes a pumping unit, a heating circuit, a vacuum circuit, an evacuation circuit, a condensing circuit and a condensate discharge circuit. The pumping unit, the heating circuit and the vacuum circuit combine to provide for removal of aqueous components from a fluid stream by heating the fluid stream and subjecting it to a partial vacuum. The evacuation circuit evacuates dehydrated fluid from a vacuum chamber, while the condensing circuit draws gaseous phase aqueous components from the vacuum chamber and condenses them. The condensate collects in a condensate collection vessel. The condensate discharge circuit includes means for changing pressure within the condensate collection vessel to force discharge of condensate from the collection vessel. In a preferred arrangement, the condensate collection vessel is subjected to a partial vacuum during normal operation of the system, and is open to atmospheric pressure during a condensate discharge phase based upon the level of condensate within the vessel.

BRIEF DESCRIPTION OF THE DRAWINGS

The foregoing and other features and advantages of the invention will become apparent upon reading the following detailed description and upon reference to the drawings in which:

FIGS. 5A through 5C are flow charts illustrating exemplary control logic for operation of the dehydrating system of FIGS. 1 and 2.

DETAILED DESCRIPTION OF SPECIFIC EMBODIMENTS

Figure 1:
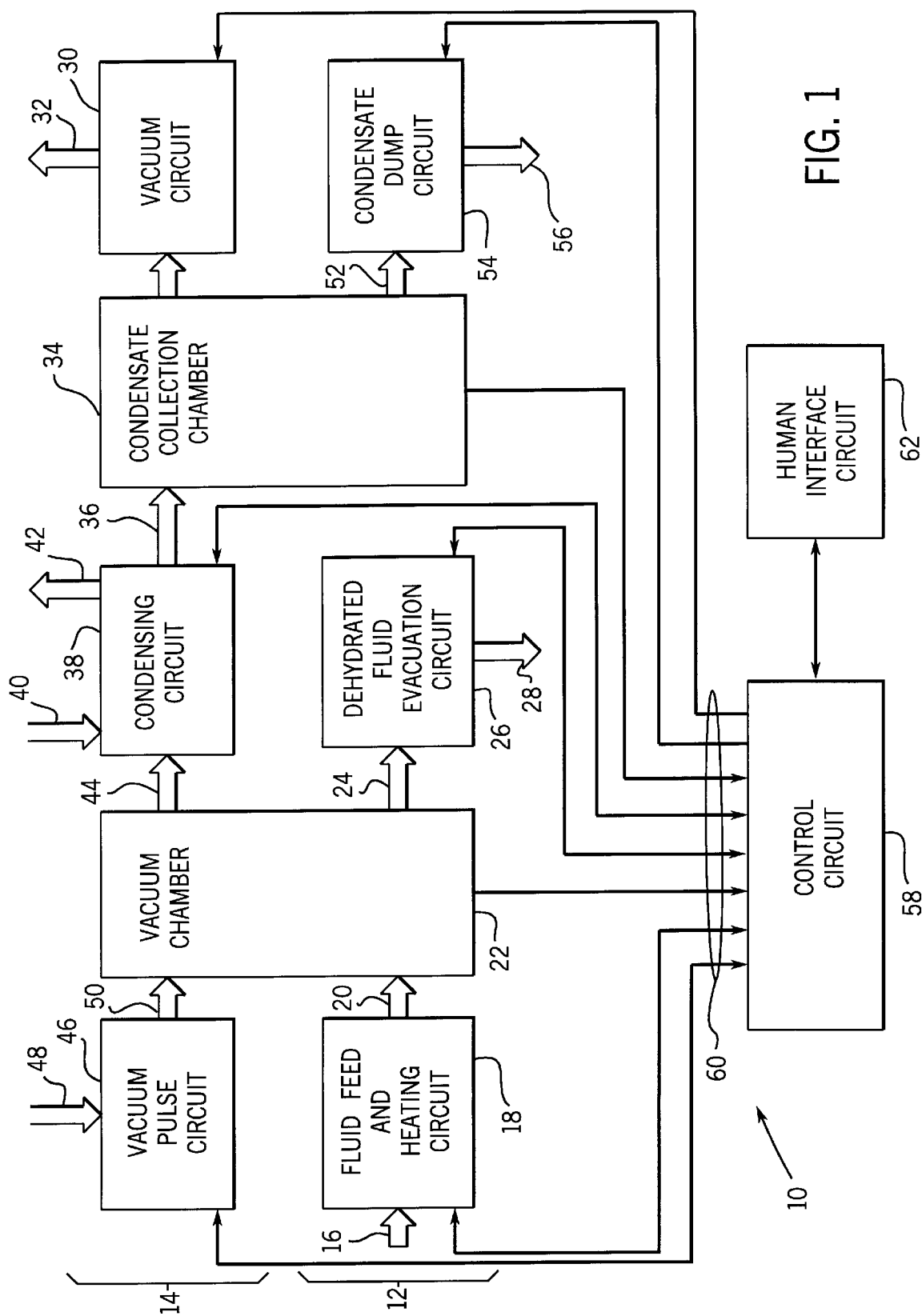
FIG. 1 is a diagrammatical representation of a dehydrating system including a number of interconnected circuits for removing entrained and emulsified water from a lubricating or hydraulic fluid.

Turning now to the drawings and referring first to FIG. 1, a dehydrating system, designated generally by the reference numeral 10, is illustrated for extracting entrained and emulsified water and other contaminants from lubricating or hydraulic fluids and the like. Dehydrating system 10 generally defines a fluid flow path 12 and a gas or vacuum flow path 14 through its various components and circuits. As illustrated in FIG. 1, at an initial location in fluid flow path 12, a flow stream 16 of lubricating or hydraulic fluid is introduced into the system. Stream 16 may originate in a fluid reservoir (not shown) or directly from one or more pieces of machinery, such as gear boxes, bearing circulating systems, and so forth. Stream 16 will generally include various contaminants, such as particulate contaminants in a solid phase, as well as a liquid or gaseous phase contaminants such as emulsified water. Stream 16 enters a fluid feed and heating circuit 18 where it is pumped and heated to a desired temperature as described more fully below. A stream of heated fluid 20 exits circuit 18 and enters a vacuum chamber 22 where emulsified and entrained water and gasses are removed. Dehydrated fluid 24 collects in chamber 22 and is evacuated from the chamber by a fluid evacuation circuit 26, producing a return fluid flow 28 which can be redirected or returned to the application or reservoir from which stream 16 was drawn, or to a separate reservoir designated for cleaned or dehydrated fluid.

Gas or vacuum flow path 14 includes a vacuum circuit 30 which continuously expels evacuated gas, as indicated at reference numeral 32, to subject elements of system 10 to a pressure lower than atmospheric pressure. Vacuum circuit 30 is coupled to a condensate collection chamber 34 and also subjects chamber 34 to a partial vacuum pressure. Vacuum pressure within condensate collection chamber 34 draws condensate 36 from a condensing circuit 38. Condensate 36 will generally include various fluids, primarily water, removed from flow stream 16 within vacuum chamber 22. To promote condensation of removed water and contaminants, condensing circuit 38 receives a flow 40 of coolant and expels heated coolant as indicated at reference numeral 42. Vacuum generated by circuit 30 draws vapors 44 into condensing circuit 38 from vacuum chamber 22. Gas or vacuum flow path 14 further includes a vacuum pulse circuit 46 which periodically introduces a pulsed flow of ambient air into vacuum chamber 22 as indicated at reference numeral 50 to further promote removal of contaminants from stream 16.

Within condensate collection chamber 34, removed water accumulates and is discharged in a condensate stream, designated 52, by a condensate dump circuit 54. Waste condensate 56 may then be channeled to a designated collection point or a waste reservoir (not shown). It should be noted that where desired gases may alternatively be evacuated from chamber 22 and discharged from system 10 in vapor phase. In such systems condensing circuit 38 and condensate collection chamber 34 may be omitted.

In accordance with a particularly preferred arrangement of the circuits and devices described generally above, a central control circuit 58 controls and coordinates operation of the various functional circuit components in accordance with a preset control routine. More particularly, the circuits described above include a number of sensors and actuators, described more fully below with reference to FIG. 2, which are coupled to control circuit 58 via appropriate data links 60. As will be appreciated by those skilled in the art, data links 60 may include hard-wired input/output conductors, serial or parallel communication conductors, networked remote input/output circuitry and so forth. Sensed data relating to operational parameters of system 10 are communicated to control circuit 58 and are processed in accordance with control logic explained more fully below with reference to FIGS. 5A–5C. Control circuit 58 therefore includes a central processing circuit and memory for storing the coded control routine. The central processing circuit included in control circuit 58 may be based upon a variety of computer platforms, such as a programmable logic controller available from PLC Direct of Cumming, Ga. under the commercial designation Model 250. A human interface circuit 62 is coupled to control circuit 58 for configuring circuit 58 and for monitoring or modifying parameters sensed and communicated to circuit 58. Human interface circuit 62 may include a conventional computer monitor, keyboard or other input and output devices.

Figure 2:
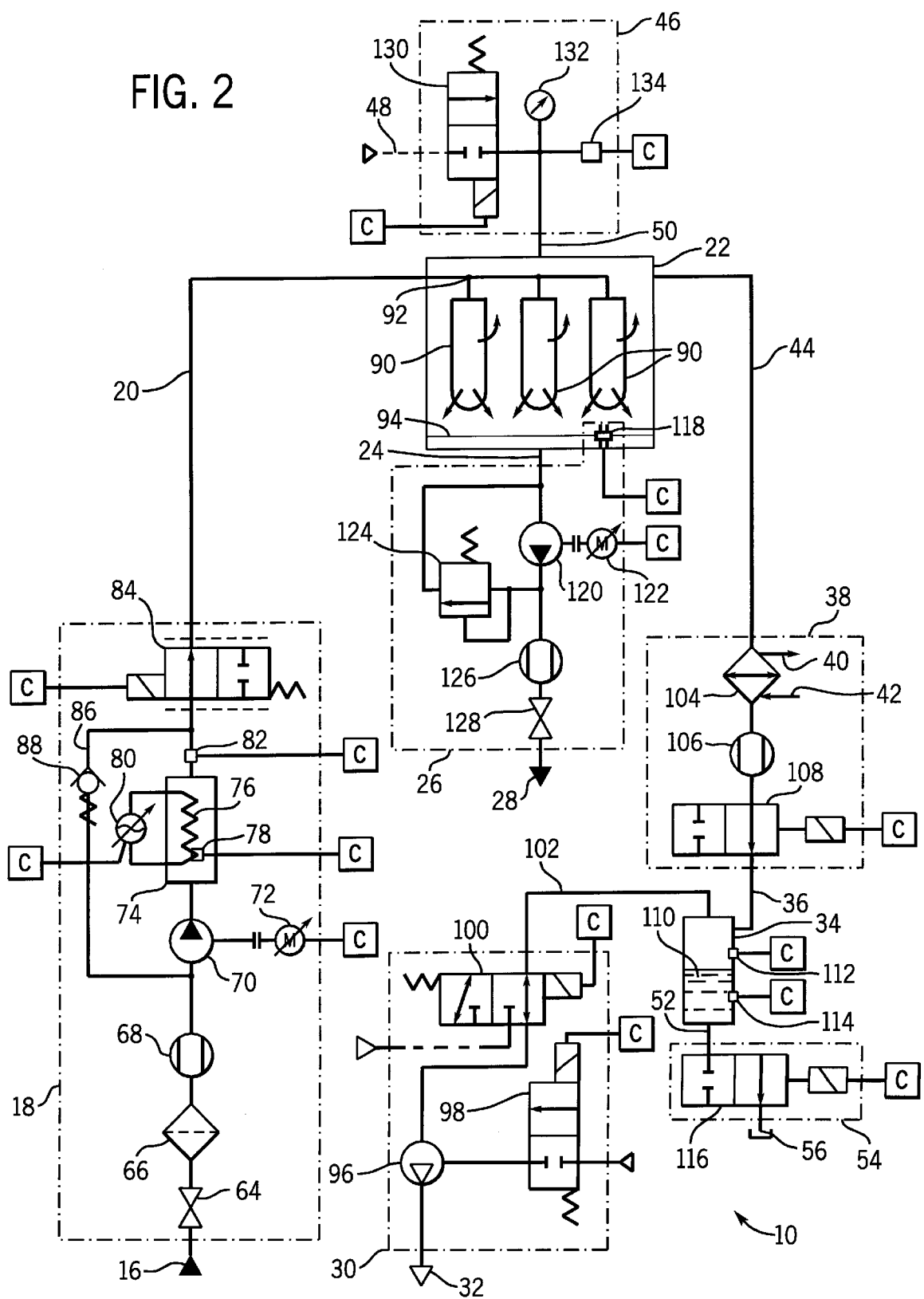
FIG. 2 is a detail circuit diagram of the system of FIG. 1 illustrating the component parts of the various circuits.

FIG. 2 illustrates in greater detail a diagrammatical layout for the interconnected components of the circuits represented in FIG. 1. As noted above, a fluid stream 16 enters system 10 via feed and heating circuit 18. Circuit 18 includes a manual flow control valve 64, a filter or strainer 66, and a visual flow meter 68 coupled in series upstream of a primary pump 70. Pump 70 is preferably a positive displacement pump, such as an external gear pump of conventional design. Pump 70 is driven by an electric motor 72 which may be driven at various speeds as commanded by control circuit 58 to vary output flow rate from pump 70. It should be noted, that throughout FIG. 2, control circuit 58 is denoted by the letter "C" in a block. As will be appreciated by those skilled in art, various drives may be employed for regulating speed of motor 72, such as a variable frequency inverter drive of a type well known in the art.

Pump 70 draws fluid stream 16 through valve 64, strainer 66 and visual flow meter 68 and expresses the stream of fluid into a heating unit 74. Heating unit 74 is preferably constructed as a flow-through chamber in which a resistive heating element 76 is housed. Fluid expressed by pump 70 thus flows around element 76, contacting element 76 to heat stream 16 to a desired temperature. A temperature sensor 78, preferably in the form of a resistive temperature detector, is secured to the surface of the element 76 and produces a surface or skin temperature signal proportional to the temperature of the surface of element 76. The temperature signal generated by sensor 78 is conveyed to control circuit 58 for processing as described below. Heating element 76 is supplied with electrical energy from a variable power source 80 which is commanded by control circuit 58. Power source 80 is preferably an SCR-type power supply available commercially from Watlow under the designation D B 2V-2060-F000.

Once heated by element 76, fluid stream 16 flows from heating unit 74. A temperature sensor 82, which is also preferably a resistive thermal device, detects the temperature of the stream exiting heating unit 74 and conveys a signal representative of the fluid temperature to control circuit 58. The heated fluid stream 16 is directed to a two-position, two-way proportional valve 84 which permits flow of the heated fluid to enter into vacuum chamber 22 or to be redirected through a recirculation conduit 86 as described in greater detail below. The position of valve 84 is controlled by control circuit 58 by means of a solenoid operator or a similar structure. In general, valve 84 is positioned by control circuit 58 to redirect some or all flow exiting heating unit 74 back to an inlet side of pump 70 until the fluid temperature as detected by sensor 82 rises to an appropriate level for flashing aqueous contaminants from fluid stream 16. A back pressure check valve 88 is positioned within recirculation conduit 86 to force fluid through valve 84, but to allow a portion or all of the fluid to be recirculated through pump 70 and heating unit 74 depending upon the position of valve 84.

Fluid permitted to pass through valve 84 is conveyed via conduit 20 into vacuum chamber 22. Within vacuum chamber 22, a series of coalescent filters 90 coupled to a manifold 92, increase the surface area of fluid exposed to a partial vacuum pressure within chamber 22 to flash or evaporate aqueous components of the fluid stream from the lubricating or hydraulic oil. Dehydrated oil then collects in a bottom portion of chamber 22 as indicated at reference numeral 94. The dehydrated fluid is evacuated from vacuum chamber 22 by evacuation circuit 26 as described in greater detail below.

As mentioned above, vacuum circuit 30 serves to draw a partial vacuum within vacuum chamber 22 as well as within intermediate components of system 10 positioned in a flow stream vacuum circuit 30 and chamber 22. As illustrated in FIG. 2, vacuum circuit 30 includes a vacuum pump 96 which discharges gas drawn from system 10 to reach the desired vacuum pressure within chamber 22. In the presently preferred embodiment, vacuum pump 96 is a Venturi-type vacuum pump to which a flow of compressed air is applied to produce the desired vacuum. Alternatively, appropriate rotary vacuum pumps may be employed in place of pump 96. Vacuum pump 96 is supplied with a flow of pressurized air via a supply valve 98 and draws a vacuum on chamber 22 through a discharge valve 100. Valve 98, which is preferably a two-position two-way solenoid operated directional control valve commanded by control circuit 58, permits vacuum pump 96 to be selectively coupled and uncoupled from a source of pressurized air. Discharge valve 100, which is preferably a two-position three-way solenoid operated directional control valve commanded by control circuit 58 permits a vacuum created by pump 96 to be drawn on a vacuum conduit 102 during normal operation of system 10. During a condensate dump sequence, as described more fully below with reference to FIGS. 5A through 5C, valve 100 may be shifted to isolate pump 96 from conduit 102 and to allow atmospheric pressure into conduit 102 to discharge condensate collected within condensate collection vessel 34.

In addition to creating a partial vacuum within system 10, vacuum circuit 30 serves to draw gaseous phase components from vacuum chamber 22 into condensing circuit 38 where the components are condensed to a liquid phase and conveyed to condensate collection vessel 34. Thus, as illustrated in FIG. 2, condensing circuit 38 includes a condenser or heat exchanger 104 through which a flow of coolant, such as water or air, is circulated as indicated by reference numerals 40 and 42. In the preferred embodiment, heat exchanger 104 is a shell-in-tube heat exchanger oriented vertically with an inlet for conduit 44 at a top position and an outlet at a bottom position. Moreover, flow of coolant through heat exchanger 104 is preferably in a direction opposite that of the flow of incoming gasses and outgoing condensate through the exchanger 104. The preferred orientation of heat exchanger 104 and the flow paths through the exchanger permit the heat exchanger to fill with circulating coolant during operation. From heat exchanger 104, condensate flows through a visual flow meter 106 and into condensate collection vessel 34 via an isolation valve 108. In the presently preferred embodiment, isolation valve 108 is a two-position, two-way valve, such as a ball valve, coupled to an integral actuator, the operation of which is commanded by control circuit 58. Isolation valve 108 permits condensing circuit 38 to be isolated from condensate collection vessel 34 during condensate dump sequences as described more fully below.

Condensate, designated generally by reference numeral 110, including water and other components removed in vacuum chamber 22 collects within condensate collection vessel 34. Vessel 34 is instrumented with a high-level switch 112 and a low-level 114 positioned within vessel 34 at locations corresponding to desired upper and lower levels of condensate, respectively. Signals produced by switches 112 and 114 are transmitted to control circuit 58 for processing. When the level of condensate 110 within vessel 34 reaches the upper limit as indicated by switch 112, a condensate dump valve 116 may be sequenced along with discharge valve 100 and isolation valve 108 to drain condensate 110 from vessel 34. In the presently preferred embodiment, condensate dump valve 116 is a two-position, two-way valve, such as a ball valve having an integral actuator commanded by control circuit 58.

As mentioned above, dehydrated fluid 94 collecting within vacuum chamber 22 is evacuated from chamber 22 by evacuation circuit 26. As illustrated in FIG. 2, evacuation circuit 26 includes a level sensor 118 which detects the level of fluid within chamber 22 and produces a signal representative thereof, which is conveyed to control circuit 58. In the presently preferred embodiment, sensor 118 is a magnetostrictive sensor having a magnet mounted on a float which is allowed to rise and fall with the level of fluid 94. A sensor of this type is commercially available from MTS Systems Corp. of Cary, N.C. Evacuation circuit 26 further includes a pump 120 driven by an electric motor 122 to draw fluid from chamber 22. Electric motor 122 is preferably coupled to a motor drive permitting it to be driven at desired speeds as commanded by control circuit 58. Suitable motor drives include variable frequency inverter drives similar to that used to control the speed of motor 72 described above. Output flow of dehydrated fluid from pump 120 is conveyed through a visual flow meter 126 and a manual valve 128 to exit system 10 as indicated at reference numeral 28. A relief valve 124 is provided around pump 120 to permit fluid to recirculate and to avoid excessive back pressures on flow meter 126 in the event of an obstruction downstream.

Also as mentioned above, system 10 and includes a vacuum pulse circuit 46 configured to enhance removal of aqueous contaminants from fluid stream 16 by causing variations in the vacuum pressure within vessel 22 and flow of rarefied air within chamber 22. As illustrated in FIG. 2, circuit 46 includes a pulse valve 130, in the form of a two-position, two-way, solenoid-actuated directional control valve the position of which is commanded by control circuit 58. Valve 130 permits atmospheric air to enter into vacuum chamber 22 in accordance with a predetermined control routine, to pulse the vacuum pressure produced by vacuum circuit 30. A pressure gauge 132 is provided between valve 130 and vacuum chamber 122 to allow an operator to visually read the current pressure within vacuum pulse circuit 46. Moreover, a pressure sensor 134 is provided adjacent to valve 130 to sense the level of vacuum pressure within vacuum pulse circuit 46. Sensor 134, which may be any suitable type of vacuum pressure sensor, produces a signal representative of the vacuum pressure and transmits the signal to control circuit 58.

Figure 3:
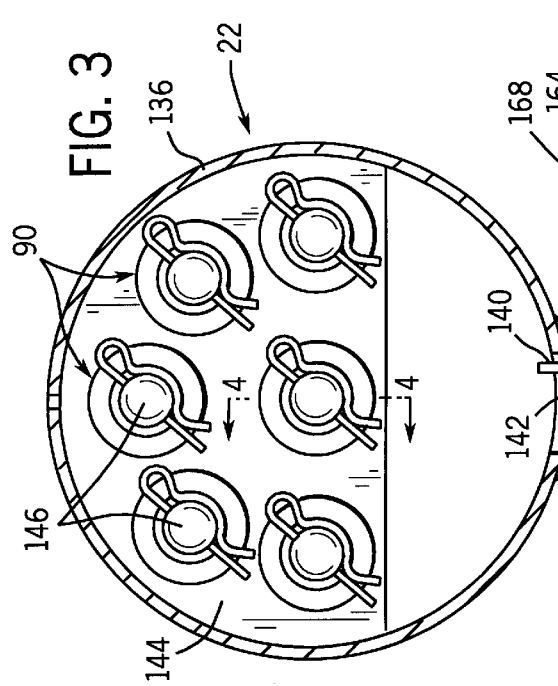
FIG. 3 is a cross-sectional view of an exemplary vacuum chamber in accordance with a preferred embodiment for extracting water from the lubricating or hydraulic fluid.
Figure 4:
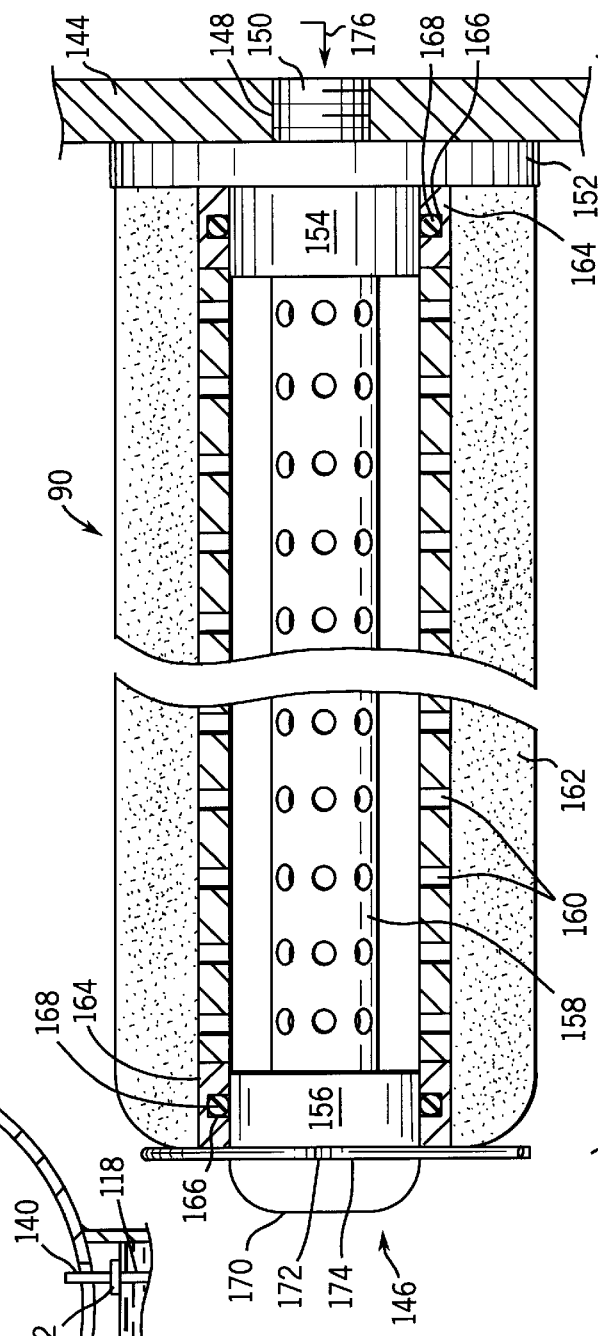
FIG. 4 is a sectional view of a filtering element which serves to disburse or increase the exposed surface area of fluid flowing into the chamber illustrated in FIG. 3, sectioned along line 4—4 of FIG. 3.

Preferred configurations of vacuum chamber 22 and of coalescing filter elements disposed within chamber 22 are illustrated in FIGS. 3 and 4. In the embodiment illustrated in FIG. 3, vacuum chamber 22 is an elongated cylindrical chamber formed of a metal of sufficient strength to withstand vacuum pressures generated during operation of system 10. In the illustration of FIG. 3, a vessel shell 136 has been sectioned to illustrate a preferred arrangement of coalescing filters within chamber 22. Discharge piping for removing collected dehydrated fluid 94 is positioned within a lower housing 138. However, piping leading to and from chamber 22 have been removed in FIG. 3 for explanatory purposes. Level sensor 118 is provided in lower housing 138 and includes a sensor rod 140 extending in a generally vertical orientation and a float 142 on which a magnet is supported for producing an output signal representative of the level of fluid within chamber 22. A manifold plate 144 is supported in a rear end of vessel shell 136 and serves to channel flow stream 16 through a series of six coalescing filters 90 supported thereon. Each coalescing filter includes a coalescing filter element sealingly supported on an element support 146 firmly secured to manifold plate 144. It should be noted that more or fewer filters 90 may be provided, depending upon the flow rate through system 10. Moreover, other arrangements may be employed to increase the surface area of fluid exposed to the reduced pressure within chamber 22, or otherwise to promote evaporation of aqueous components of flow stream 16.

FIG. 4 illustrates in greater detail a preferred arrangement for securing coalescing filters 90 within vacuum chamber 22. As shown in FIG. 4, manifold plate 144 includes a threaded aperture 148 for each filter, and in which each coalescent element support 146 is secured via a hollow threaded extension 150. Each element support 146 includes a base plate 152, a rear support 154, and a forward support 156. An integral perforated tube 158 extends between rear support 154 and forward support 156 for permitting fluid to be dispersed through the filter. Each coalescent filter 90 includes a perforated core 160 around which a filter layer 162 is provided. Prefabricated coalescing filter elements of the type illustrated in FIG. 4 are commercially available from Velcon of San Jose, Calif.

At either end of perforated core 160, each coalescing filter element includes a seal support 164 in which an inner annular groove 166 is formed. A seal 168, such as an o-ring seal, is positioned within each groove 166 and is compressed during installation of the coalescing element on rear and forward supports 154 and 156, to seal an inner volume between perforated tube 158 and perforated core 160. Forward support 156 terminates in a rounded tip 170 through which a pin aperture 172 is formed. A retaining pin or clip 174 is inserted into each pin aperture 172 to retain the coalescing filter element sealingly supported on each element support 146. During operation, fluid enters into each coalescing element as indicated by arrow 176 in FIG. 4. Fluid is then expelled from tube 158 and through core 160 into filter layer 162. Filter layer 162 serves to substantially increase the surface area of fluid exposed to the partial vacuum present within chamber 22 during operation.

Figure 5A:
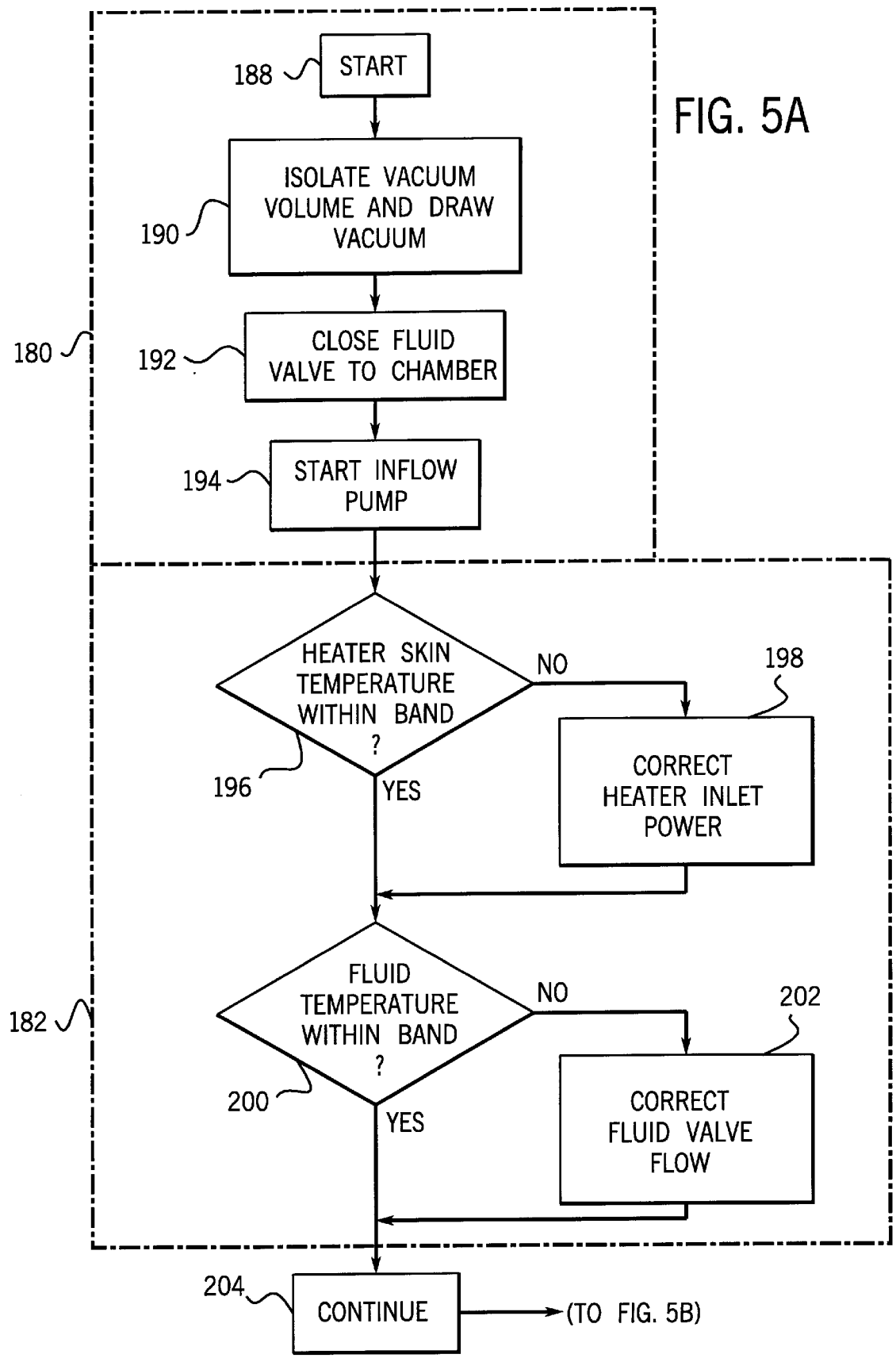

Operation of dehydrating system 10, configured as described above, will now be described with particular reference to FIGS. 5A through 5C. As previously described, the sensors and actuators of system 10 are preferably controlled and coordinated by a central control circuit 58 in accordance with a predetermined controlled routine. Exemplary control logic for the preferred control routine is illustrated in FIGS. 5A through 5C. The control logic may be implemented through appropriate code in any suitable format, such as ladder logic programming.

The illustrated exemplary logic begins with an initialization sequence 180, followed by a heating sequence 182. A vacuum pressure pulse sequence 184 is continuously executed following start up of system 10, as is a condensate dump sequence as indicated by reference numeral 186. While FIGS. 5A through 5C illustrate certain steps in exemplary control logic, it should be understood that the control routine implemented by control circuit 58 may include additional sequences, such as for continuously controlling the level of dehydrated fluid 94 collecting within vacuum chamber 22 as described in greater detail below.

Returning now to FIG. 5A, initialization sequence 180 begins at step 188. At step 190, vacuum pump 96 is operated by opening valve 98 to draw a vacuum within vacuum flow path 14, through condensate collection chamber 34 and vacuum chamber 22. Thus, in the diagrammatical view of FIG. 2, vacuum valve 98 is shifted from its default position illustrated, and discharge valve 100 is shifted to the flow-through position as shown. Also, isolation valve 108 is positioned in the flow-through position illustrated in FIG. 2, while dump valve 116 is closed as illustrated in FIG. 2. Moreover, pulse valve 130 is shifted from its default position as illustrated in FIG. 2 to prevent atmospheric pressure from entering into vacuum chamber 22. At step 192, control circuit 58 ensures that proportional valve 84 is closed (by allowing valve 84 to shift to its default position opposite that shown in FIG. 2) to prevent fluid from exiting fluid feed and heating circuit 18 into vacuum chamber 22. With portions of dehydrating circuit 10 described above thus isolated, a partial vacuum is drawn by pump 96, preferably in the range of 26 to 27 inches of mercury. Pump 70 is then driven under a command from control circuit 58, as indicated at step 194, to begin fluid flow through heating unit 74.

Heating sequence 182 begins as step 196. At step 196 control circuit 58 reads an input signal from temperature sensor 78 representative of the current surface or skin temperature of heating element 76. The skin temperature is then compared to a pre-established skin temperature limit to determine whether the skin temperature is within a desired range. An upper limit of the range will correspond to a temperature at which degradation of the lubricant being dehydrated may begin to occur, while lower end of the range will generally correspond to a predetermined deadband as measured from the upper limit. In the presently preferred embodiment, where a hydrocarbon oil is being processed to remove water, skin temperature is limited to a maximum of approximately 180° F. As will be appreciated by those skilled in the art, a proportional-integral-differential (PID) control algorithm may alternatively be used to regulate the skin temperatures and, rather than a deadband defined by upper and lower temperature limits, a single temperature setpoint value may be used as the basis for PID control.

If at step 196 the skin temperature is determined to be outside of the desired band or range, the inlet power level to element 76 is corrected by appropriately adjusting power supply 80 under a command from control circuit 58, as indicated at step 198. During initial start up of system 10, fluid stream 16 will likely be substantially cooler than the desired temperature for entering vacuum chamber 22. Accordingly, the skin temperature used in the comparison at step 196 will be substantially lower than the desired skin temperature. Until the skin temperature reaches the maximum permitted temperature, then, correction at step 198 will consist of increasing power input to heating element 76 until the maximum permitted skin temperature, or the upper limit of the power capacity of supply 80 is reached. Thereafter, steps 196 and 198 will serve to regulate the power input by supply 80 through element 76 to maintain the element skin temperature within the preset range to sufficiently heating the fluid stream, without resulting in degradation to the fluid.

In addition to closed-loop control of the heating element skin temperature, control circuit 58 regulates flow of stream 16 through valve 84 based upon the temperature of the fluid as indicated at steps 200 and 202. At step 200, the fluid temperature as indicated by sensor 82 is compared to a desired range and, if the temperature is found to be outside the range, valve 84 is adjusted to properly direct flow through recirculating line 86 and conduit 20. In the presently preferred embodiment, a fluid temperature of approximately 160° F. is desired for fluid entering into vacuum chamber 22. The range used at step 200 is thus established by a relatively narrow deadband about this desired temperature. As mentioned above with respect to control of the heating element skin temperature, regulation of the fluid temperature may be accomplished by PID control based upon the desired fluid temperature setpoint. Proportional valve 84 is appropriately positioned to cause recirculation of at least a portion of the fluid through heating unit 74 to raise the fluid temperature to within this desired range. During an initial phase of operation, step 202 will therefore result in substantially closing valve 84 to flow, causing recirculation of substantially the entire flow of pump 70 through heating unit 74. Once the desired temperature has been obtained, valve 84 is modulated to permit a portion of the heated fluid to flow into vacuum chamber 22, while recirculating a sufficient quantity of fluid to maintain the desired temperature.

As will be appreciated by those skilled in the art, the control loops established by the logic of heating sequence 182 effectively regulates the throughput of system 10 based upon fluid temperature. Moreover, the throughput thus regulated ensures not only that the fluid entering vacuum chamber 22 will be sufficiently heated to remove aqueous contaminants, but extends the effective residence time within heating unit 74 to maintain the desired temperature, while avoiding harmful degradation to the circulated fluid by elevated heating element skin temperatures, as could occur in heretofore known dehydrating systems.

Following heating sequence 182, control circuit 58 advances to vacuum pulse sequence 184 as indicated by block 204 in FIGS. 5A and 5B. Sequence 184 is continuously executed throughout operation of system 10 to aid in evaporating or flashing aqueous components from stream 16. As summarized above, heated fluid is introduced into vacuum chamber 22 through conduit 20 at a temperature sufficient to flash aqueous components therefrom. The fluid is channeled through coalescing filters 90 from which the dehydrated lubricant drops to a lower level within vacuum chamber 22 and evaporated gaseous phase contaminants are drawn off by virtue of the elevated temperature and vacuum present within chamber 22. The level of the vacuum within chamber 22 is pulsed as summarized in FIG. 5B.

Vacuum pulse sequence 184 begins at step 206 where control circuit 58 reads the input signal generated by pressure sensor 134 and compares the signal to a predetermined maximum vacuum level (i.e., minimum absolute pressure). In the presently preferred embodiment, the level of vacuum within system 10 is permitted to be drawn down to approximately 27 inches of mercury. When the maximum vacuum level is reached, valve 130 is shifted under a command from control circuit 58 to allow atmospheric air to enter vacuum chamber 22. If at step 206 the vacuum pressure is found not to meet or exceed the maximum level of vacuum, control circuit 58 advances from step 206 to step 210. At step 210, control circuit 58 compares the pressure detected by sensor 134 to a desired minimum vacuum level (i.e., maximum absolute pressure). In the presently preferred embodiment the level of vacuum within system 10 is allowed to reach a minimum of maintained below 26 inches of mercury. If the level of vacuum within the system is determined at step 210 to be at or less than the desired minimum vacuum level, valve 130 is closed under a command from control circuit 58 to prevent any further atmospheric air from entering into vacuum chamber 22. Thus, steps 206, 208, 210 and 212 provide for cyclic or periodic pulsing of a flow of atmospheric air into chamber 22 during continuous operation of vacuum pump 96.

In the preferred embodiment, it has been found that the draw-down phase of operation of circuit 46 from the minimum vacuum level to the maximum vacuum level typically occurs on the order of several seconds. The build-up phase of the vacuum pulse is substantially shorter, resulting in continuous, periodic pulsing of pressure and flow of atmospheric air through chamber 22 and around coalescing filters 90. As indicated by block 214 in FIGS. 5B and 5C, following sequence 184, control circuit 58 advances to condensate dump sequence 186 as summarized in FIG. 5C.

As shown in FIG. 5C, control circuit 58 coordinates operation of components of system 10 to automatically dump condensate 110 from condensate collection vessel 34. Thus, at step 216, control circuit 58 checks an input signal from high level switch 112 to determine whether condensate has collected up to the maximum desired level within vessel 34. If such is not the case, control advances to block 218 and therefrom returns to heating sequence 182 of FIG. 5A. If, on the other hand, the condensate level within vessel 34 is found to be high, control circuit 58 latches the input from switch 112 and advances to step 220. At step 220, condensate inlet or isolation valve 108 is shifted to its closed position to isolate vacuum chamber 22 from condensate collection vessel 34. At step 222, condensate dump valve 116 is shifted from its blocked position to its open position to allow condensate to drain from vessel 34. At step 224 vacuum within chamber 34 is vented by shifting valve 100 from its flow-through position illustrated in FIG. 2 to its second position, thereby allowing atmospheric air to enter into vacuum chamber 34. Condensate within vacuum chamber 34 is thus ejected through valve 116 by virtue of the change in pressure within the vessel and under the influence of gravity.

At step 226, control circuit 58 checks for an output signal from low level switch 114 to determine whether the desired low condensate level within vessel 34 has been reached. If such is not the case, circuit 58 advances to block 218 and therefrom returns to heating sequence 182 as summarized in FIG. 5A. Once the desired low level is reached, the comparison at step 226 will be affirmative, and control circuit 58 unlatches input from switch 112 and advances to step 228. At step 228, valve 100 is shifted back to its flow-through position as illustrated in FIG. 2. At step 230, condensate dump valve 116 is closed and, at step 232, condensate inlet or isolation valve 108 is opened. Condensate is then permitted to be drawn through valve 108 and to collect in vessel 34 as described above, until the high condensate level is again detected at step 216 to repeat the foregoing condensate dump sequence.

As indicated above, in addition to the control logic summarized in FIGS. 5A through 5C, control circuit 58 preferably continuously evacuates dehydrated fluid collecting within chamber 22. In the presently preferred embodiment, feedback signals from level sensor 118 are read during cyclic implementation of the control sequence implemented by control circuit 58. The speed of motor 122 is varied to vary the flow rate of fluid displaced by pump 120 to maintain the desired level of fluid within chamber 22. In a preferred arrangement, the level of fluid within chamber 22 may be set by an operator, and is preset at a default value within lower housing 138.

Based upon the preset depth of dehydrated fluid permitted to collect within vacuum chamber 22, control circuit 58 regulates the flow rate of pump 20 in a closed-loop manner to maintain the desired level of fluid. Thus, during an initialization stage of operation, pump 120 may not be driven to permit dehydrated fluid to accumulate within chamber 22. Once level sensor 118 indicates that the desired level of fluid has accumulated within the chamber, pump 120 will be driven by motor 122 under the command of control circuit 58 to evacuate fluid from chamber 22 on a continuous basis to maintain the desired level. It has been found that closed-loop operation of evacuation circuit 26 effectively provides sufficient feed fluid for pump 120, while avoiding excessive accumulation of fluid within chamber 22 that could otherwise result in undesirable foaming of the fluid.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for removing aqueous components from a fluid, the system comprising:

a pumping unit configured to pump a stream of fluid from which aqueous components are to be removed;

a heating unit coupled to the pumping unit for heating the fluid stream, the heating unit including a heating element and a sensor secured to the heating element for detecting temperature of a surface of the heating element and for generating a surface temperature signal representative thereof;

a fluid temperature sensor downstream of the heating unit, the fluid temperature sensor being configured to detect temperature of the fluid stream and to generate a fluid temperature signal representative thereof;

a vacuum circuit coupled to the heating unit for subjecting the heated fluid stream to a pressure lower than atmospheric pressure to remove aqueous components from the fluid stream;

a recirculation loop for directing at least a portion of the fluid stream through the heating unit based upon the fluid temperature signal to maintain the fluid temperature at a desired level, the recirculation loop including a valve for regulating flow rate of fluid from the heating unit to the vacuum circuit; and a control circuit coupled to the heating unit and configured to limit energy input to the heating element to limit the temperature of the heating element surface based upon the surface temperature signal.

2. The system of claim 1, wherein the vacuum circuit includes a vacuum chamber and means for drawing a vacuum within the vacuum chamber, and wherein the system further includes an evacuation circuit for evacuating dehydrated fluid from the vacuum chamber based upon a level of dehydrated fluid within the vacuum chamber.

3. The system of claim 2, wherein the evacuation circuit includes a level sensor disposed within the vacuum chamber to detect the level of dehydrated fluid within the vacuum chamber and to generate a level signal representative thereof, and an evacuation pump circuit configured to draw dehydrated fluid from the vacuum chamber based upon the level signal.

4. The system of claim 1, wherein the vacuum circuit includes a vacuum chamber and means for cyclically varying vacuum pressure within the vacuum chamber.

5. The system of claim 4, wherein the means for cyclically varying the vacuum pressure introduces pulsed flow of air through the vacuum chamber.

6. The system of claim 1, further comprising a condensing circuit coupled to the vacuum circuit, the condensing circuit being configured to condense gaseous phase aqueous components removed from the fluid stream.

7. The system of claim 6, wherein the condensing circuit includes a condensate collection vessel and a discharge circuit configured to discharge condensate from the condensate collection vessel.

8. The system of claim 7, wherein the system includes means for changing pressure within the collection vessel, and wherein the condensate discharge circuit includes a discharge valve configured to discharge condensate from the collection vessel under the influence of pressure within the collection vessel.

9. A system for removing aqueous components from a fluid, the system comprising:

a pumping unit configured to pump a stream of fluid from which aqueous components are to be removed;

a heating circuit coupled to the pumping unit for heating the fluid stream;

a vacuum circuit downstream of the heating circuit for subjecting heated fluid to a pressure lower than atmospheric pressure to remove aqueous components therefrom;

a temperature controlled recirculation circuit coupled to the heating circuit, the recirculation circuit including a fluid temperature sensor, a recirculation loop and a control valve, the recirculation loop directing a first portion of the fluid stream through the heating circuit based upon the fluid temperature and directing a second portion of the fluid stream through the vacuum circuit; and a control circuit coupled to the temperature sensor and to the control valve, the control circuit configured to regulate flow through the control valve based upon a temperature signal from the temperature sensor.

10. The system of claim 9, wherein the heating circuit includes a heating element and a sensor for detecting temperature of a surface of the heating element, and wherein the system further comprises means for limiting the surface temperature of the heating element to a desired surface temperature.

11. The system of claim 10, wherein the means for limiting the surface temperature includes a variable power source controllable to limit energy input to the heating element.

12. The system of claim 10, wherein the control circuit is configured to regulate flow to the vacuum circuit to maintain the fluid stream at a desired fluid temperature, the desired fluid temperature being lower than the desired surface temperature.

13. The system of claim 9, wherein the vacuum circuit includes a vacuum chamber and means for drawing a vacuum within the vacuum chamber, and wherein the system further includes an evacuation circuit for evacuating dehydrated fluid from the vacuum chamber based upon a level of dehydrated fluid within the vacuum chamber.

14. The system of claim 13, wherein the evacuation circuit includes a level sensor disposed within the vacuum chamber to detect the level of dehydrated fluid within the vacuum chamber and to generate a level signal representative thereof, and an evacuation pump circuit configured to draw dehydrated fluid from the vacuum chamber based upon the level signal.

15. The system of claim 9, wherein the vacuum circuit includes a vacuum chamber and means for cyclically varying vacuum pressure within the vacuum chamber.

16. The system of claim 15, wherein the means for cyclically varying the vacuum pressure introduces pulsed flow of air through the vacuum chamber.

17. The system of claim 9, further comprising a condensing circuit coupled to the vacuum circuit, the condensing circuit being configured to condense gaseous phase aqueous components removed from the fluid stream.

18. The system of claim 17, wherein the condensing circuit includes a condensate collection vessel and a discharge circuit configured to discharge condensate from the condensate collection vessel.

19. The system of claim 17, wherein the system includes means for changing pressure within the collection vessel, and wherein the condensate discharge circuit includes a discharge valve configured to discharge condensate from the collection vessel under the influence of pressure within the collection vessel.

20. A system for removing aqueous components from a fluid, the system comprising:

a pumping unit configured to pump a stream of fluid from which aqueous components are to be removed;

a heating circuit coupled to the pumping unit for heating the fluid stream;

a vacuum circuit downstream of the heating circuit for subjecting heated fluid to a pressure lower than atmospheric pressure to remove aqueous components therefrom, the vacuum circuit including a vacuum chamber and means for drawing a vacuum within the vacuum chamber; and an evacuation circuit for evacuating dehydrated fluid from the vacuum chamber based upon a level of dehydrated fluid within the vacuum chamber, the evacuation circuit including a level sensor disposed within the vacuum chamber to detect the level of dehydrated fluid within the vacuum chamber and to generate a level signal representative thereof, and an evacuation pump circuit configured for drawing dehydrated fluid from the vacuum chamber based upon the level signal.

21. The system of claim 20, wherein the heating circuit includes a heating element and a sensor for detecting temperature of a surface of the heating element, and wherein the system further comprises means for limiting the surface temperature of the heating element to a desired surface temperature.

22. The system of claim 20, further comprising a recirculation circuit coupled to the heating circuit, the recirculation circuit including a fluid temperature sensor and a recirculation loop, the recirculation loop directing a first portion of the fluid stream through the heating circuit based upon the fluid temperature and directing a second portion of the fluid stream through the vacuum circuit.

23. The system of claim 20, wherein the vacuum circuit includes a vacuum chamber and means for cyclically varying vacuum pressure within the vacuum chamber.

24. The system of claim 23, wherein the means for cyclically varying the vacuum pressure introduces pulsed flow of air through the vacuum chamber.

25. The system of claim 20, further comprising:

a condensing circuit coupled to the vacuum circuit, the condensing circuit being configured to condense gaseous phase aqueous components removed from the fluid stream, the condensing circuit including a condensate collection vessel and a discharge circuit configured to discharge condensate from the condensate collection vessel; and means for changing pressure within the collection vessel;

wherein the condensate discharge circuit is configured to discharge condensate from the collection vessel under the influence of pressure within the collection vessel.

26. A system for removing aqueous components from a fluid, the system comprising:

a pumping unit configured to pump a stream of fluid from which aqueous components are to be removed;

a heating circuit coupled to the pumping unit for heating the fluid stream;

a vacuum circuit downstream of the heating circuit for subjecting heated fluid to a pressure lower than atmospheric pressure to remove aqueous components therefrom, the vacuum circuit including a vacuum chamber and means for drawing a vacuum within the vacuum chamber;

an evacuation circuit for evacuating dehydrated fluid from the vacuum chamber based upon a level of dehydrated fluid within the vacuum chamber; and means for cyclically introducing pulsed flow of air through the vacuum chamber to vary vacuum pressure within the vacuum chamber.

27. The system of claim 26, wherein the means for cyclically introducing pulsed flow of air includes a pressure sensor for detecting pressure within the vacuum chamber, and a valve configured to allow flow of atmospheric air into the vacuum chamber based upon the pressure within the vacuum chamber.

28. The system of claim 27, further comprising a control circuit coupled to the pressure sensor and to the valve, the control circuit being configured to regulate flow through the valve to pulse the pressure within the vacuum chamber between predetermined pressure levels.

29. A system for removing aqueous components from a fluid, the system comprising:
- a pumping unit configured to pump a stream of fluid from which aqueous components are to be removed;
- a heating circuit coupled to the pumping unit for heating the fluid stream;
- a vacuum circuit downstream of the heating circuit for subjecting heated fluid to a pressure lower than atmospheric pressure to remove aqueous components therefrom, the vacuum circuit including a vacuum chamber and means for drawing a vacuum within the vacuum chamber;
- an evacuation circuit for evacuating dehydrated fluid from the vacuum chamber based upon a level of dehydrated fluid within the vacuum chamber;
- a condensing circuit coupled to the vacuum circuit for condensing gaseous phase aqueous components removed from the fluid stream;
- a condensate collection vessel for receiving condensate from the condensing circuit; and
- a condensate discharge circuit including means for changing pressure within the condensate collection vessel to force discharge of condensate from the collection vessel.

30. The system of claim 29, wherein the means for changing pressure within the condensate collection vessel includes valving for selectively drawing a partial vacuum within the condensate collection vessel and subsequently permitting a flow of atmospheric air into the collection vessel to discharge condensate therefrom.

31. The system of claim 30, further comprising a level sensor for detecting a level of condensate within the collection vessel, and a control circuit coupled to the level sensor and to the valving, the control circuit being configured to control the valving to permit a flow of atmospheric air into the collection vessel when a predetermined level of condensate is detected within the collection vessel.

* * * * *